United States Patent [19]
Robinson et al.

[11] Patent Number: 5,263,833
[45] Date of Patent: Nov. 23, 1993

[54] FISH GUIDING ASSEMBLY AND METHOD UTILIZING SAME

[75] Inventors: David A. Robinson, Tolland, Conn.; Charles P. Ruggles, Western Shore, Canada

[73] Assignee: Northeast Utilities Service Company, Berlin, Conn.

[21] Appl. No.: 49,832

[22] Filed: Apr. 19, 1993

[51] Int. Cl.⁵ .............................. E02B 8/08
[52] U.S. Cl. .......................... 405/81; 405/80; 405/83
[58] Field of Search .......... 405/81, 82, 83, 52, 405/80, 21, 127, 26, 27

[56] References Cited

U.S. PATENT DOCUMENTS

| | | |
|---|---|---|
| 1,225,160 | 5/1917 | Nihart ............... 405/81 X |
| 1,579,105 | 3/1926 | Green ................ 405/82 |
| 1,825,169 | 9/1931 | Wyckoff ............ 405/81 X |
| 2,169,249 | 8/1939 | Holmes et al. . |
| 2,185,458 | 1/1940 | Giliasso ............. 405/26 |
| 2,826,897 | 3/1958 | Vinsonhaler et al. . |
| 2,978,873 | 4/1961 | Wardle . |
| 3,338,056 | 8/1967 | Roscoe . |
| 3,868,324 | 2/1975 | Taylor et al. . |
| 3,938,340 | 2/1976 | Downs . |
| 4,027,486 | 6/1977 | Dougherty ........ 405/26 X |
| 4,437,431 | 3/1984 | Koch . |
| 4,481,904 | 11/1984 | Fletcher . |
| 4,488,835 | 12/1984 | Eicher . |
| 4,715,744 | 12/1987 | Richey .............. 405/26 |
| 4,929,122 | 5/1990 | Yoas . |

Primary Examiner—Dennis L. Taylor

[57] ABSTRACT

A fish guiding assembly for use adjacent to dams and the like to channel fish into a safe passage includes an elongated buoyant frame including upper and lower elongated horizontally extending frame members, and a multiplicity of vertically extending louver slats of synthetic resin horizontally spaced apart and angularly oriented relative to the longitudinal axis of said frame. Upper and lower slat mounting members extend horizontally along the length of the frame and are supported thereby, and engage the slats adjacent their upper and lower ends to retain them in angular orientation. The upper ends of the louver slats are engaged to maintain them in the mounting members.

20 Claims, 7 Drawing Sheets

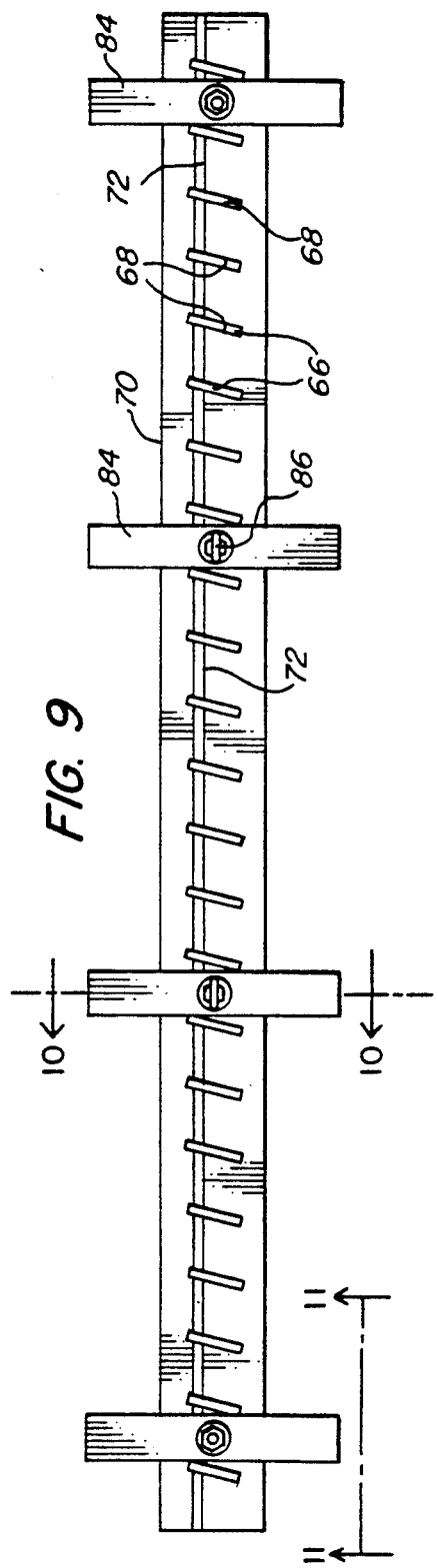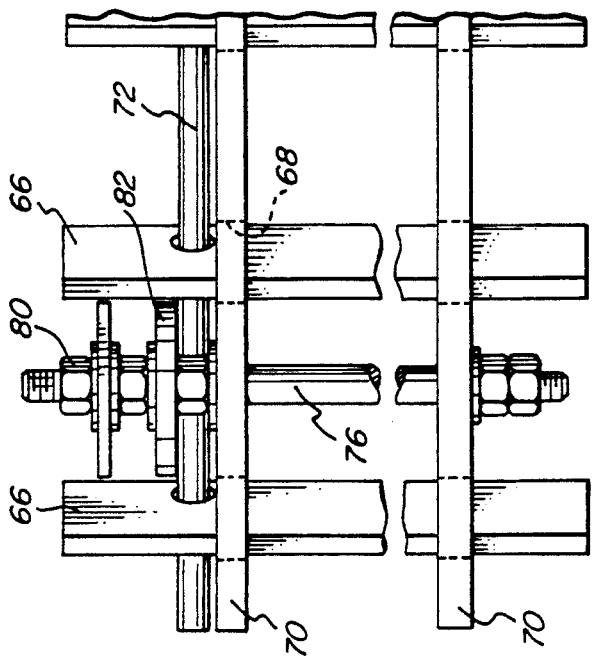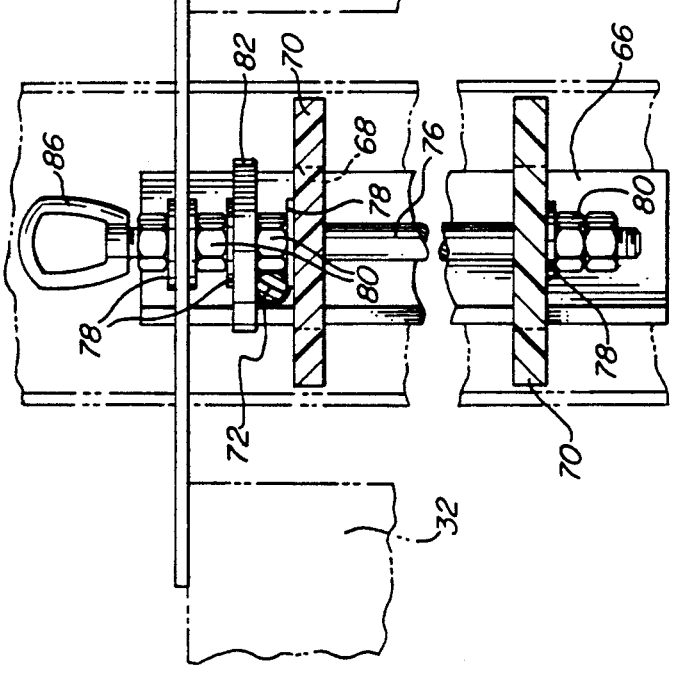

FISH GUIDING ASSEMBLY AND METHOD UTILIZING SAME

BACKGROUND OF THE INVENTION

The present invention relates to fish guiding assemblies, and, more particularly, to such assemblies which are readily assembled and which include replaceable components and fish guiding methods of using such assemblies.

Various techniques are presently used adjacent dam spillways and water intakes in an effort to divert fish away therefrom including physical barriers, ultrasound generators, lures and the like. In some instances, nets and other barriers guide the fish into safe passages such as bypass conduits.

It is known that fish are generally averse to moving into areas of turbulence and will generally avoid structures generating turbulence in a moving stream. Thus, a perforate wall in a stream can serve to guide fish into a channel by reason of the turbulence which the wall will generate while allowing the water to pass therethrough. Unfortunately, such wall structures may require frequent repair, particularly as the result of damage caused by debris impinging thereon, and they are generally costly to fabricate. Moreover, the wall structure may not generate sufficient turbulence to deter the fish from approaching the openings or structure and therefore permit them to pass therethrough.

It is an object of the present invention to provide a novel fish guiding assembly which floats within a flowing stream and which may be readily assembled.

It is also an object to provide such a fish guiding assembly which utilizes replaceable slat assemblies to provide turbulence as well as permit water flow therethrough.

Another object is to provide such a fish guiding assembly which enables facile replacement of sections which may be damaged and which also allows facile change of spacing and orientation of the turbulence producing elements.

A further object is to provide a novel method for guiding fish using a fish guiding assembly which is relatively economical to fabricate and to modify.

SUMMARY OF THE INVENTION

It has now been found that the foregoing and related objects may be readily attained in a fish guiding assembly for use adjacent to dams and the like to channel fish into a safe passage which includes an elongated buoyant frame including upper and lower elongated horizontally extending frame members and a multiplicity of vertically extending louver slats of relatively flexible synthetic resin horizontally spaced apart and angularly oriented relative to the longitudinal axis of the frame.

Upper and lower slat mounting members extend longitudinally of the frame and are supported horizontally thereby. These slat mounting members engage the slats adjacent their upper and lower ends to retain them in angular orientation. Engaging means secure the upper ends of the louver slats to maintain them in the mounting members.

Preferably, the slat mounting members are elongated and horizontally disposed, and they have slots therein through which the louver slats extend. Desirably, they are fabricated from synthetic resin, and the engaging means comprises an elongated rod extending through the upper ends of the slats above the upper slat mounting member.

Generally, the frame also includes vertical members extending between the horizontally extending frame members, and buoyant elements in addition to the horizontally and vertically extending frame members. Desirably, the frame is fabricated from a multiplicity of disassemblable sections to provide an elongate structure and includes coupling elements to join the sections in rigid assembly.

In a preferred embodiment, the frame includes longitudinally extending frame members fabricated of wood and a vertically extending members spaced intermediate the length of the frame members and extending therebetween; the coupling elements couple the abutting ends of the longitudinally extending frame members. Desirably, the sections include two spaced pairs of wood frame members at the top of the frame, one pair extending longitudinally along each side of the vertical members, and the buoyant elements are disposed in the spacing between the wood members of each pair.

In one desirable embodiment, the slats, the mounting members and the engaging means are preassembled to provide a removable assembly, and this assembly is removably seated in the spacing between the longitudinally extending wooden members and the vertical members. The frame includes securing means for engagement with cables and the like to secure the assembly in position within a flowing body of water.

BRIEF DESCRIPTION OF THE DRAWINGS

FIG. 9 is a plan view of a slat assembly;

FIG. 10 is a fragmentary sectional view of a slat assembly along the line 10—10 of FIG. 9 and showing it supported on two frame members illustrated in phantom line;

FIG. 11 is a fragmentary side elevational view of the slat assembly along the line 11—11 of FIG. 9;

DETAILED DESCRIPTION OF THE PREFERRED EMBODIMENT

Figure 1:
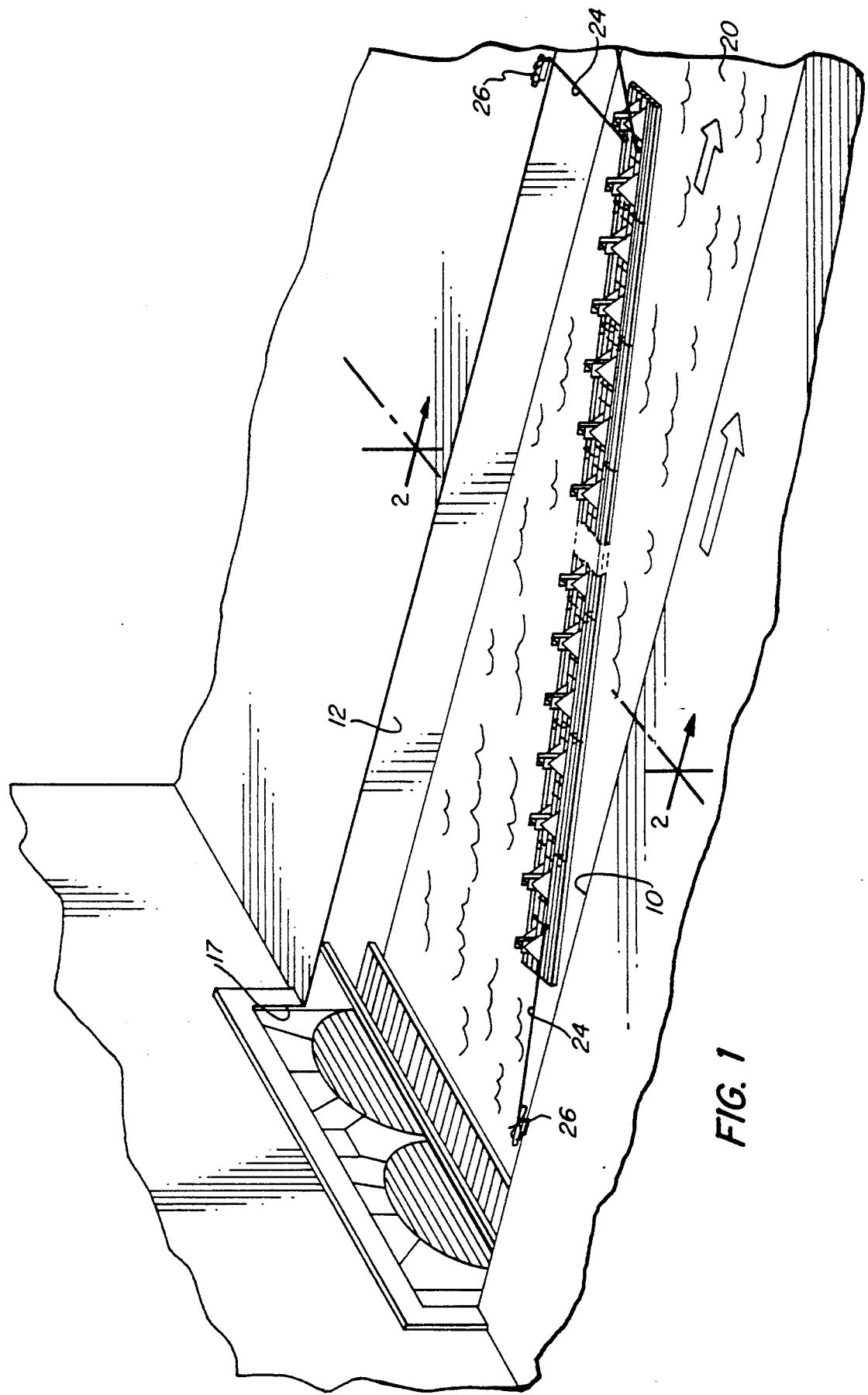
FIG. 1 is a fragmentary perspective view of a canal in which a fish guiding assembly embodying the present invention is installed in a canal adjacent a power plant turbine intane (not shown)
Figure 2:
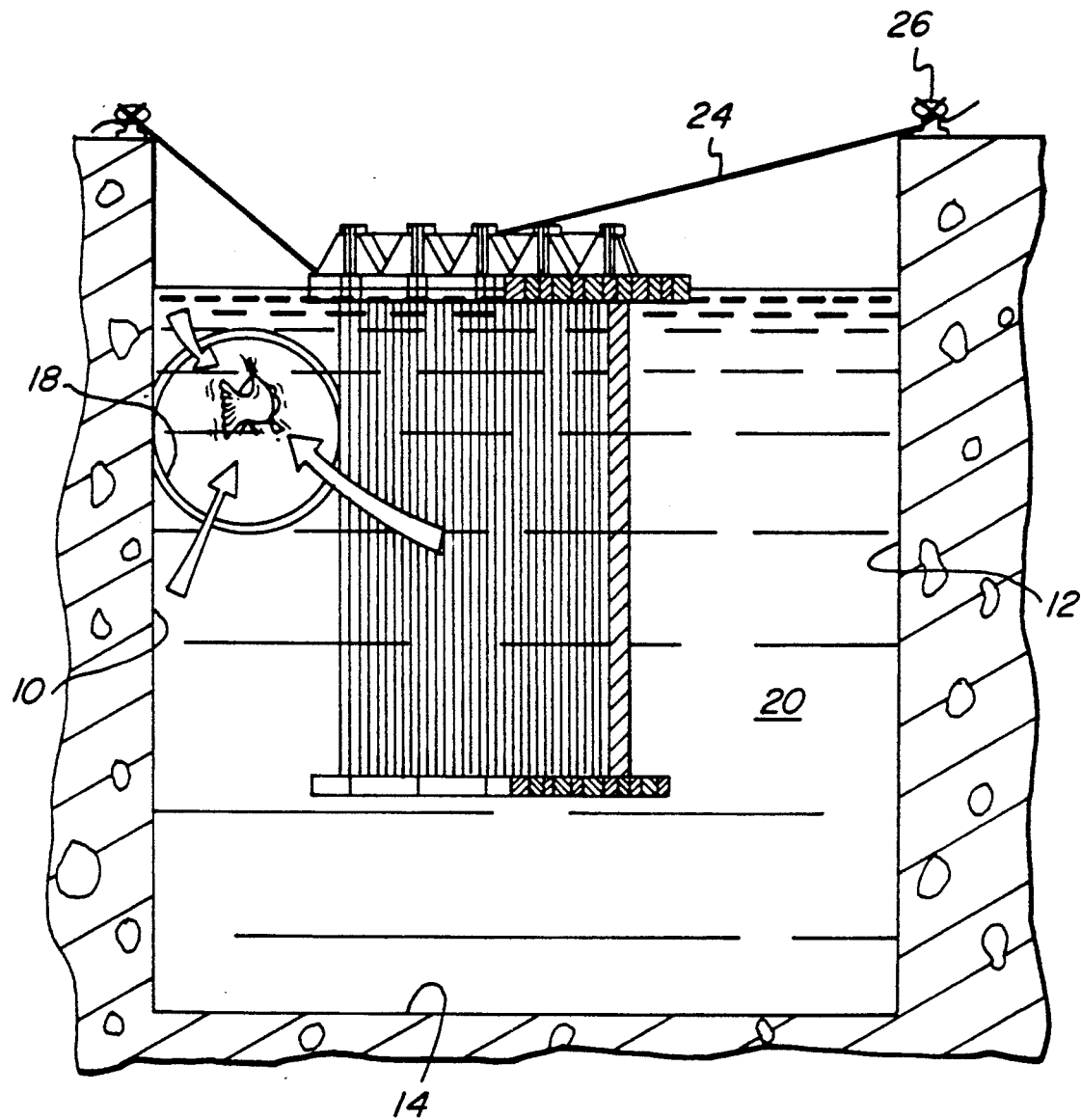
FIG. 2 is a fragmentary side elevational view of the canal installation along the line 2—2 of FIG. 1.

Turning first to FIGS. 1 and 2, therein illustrated is a portion of a power plant canal defined by the sidewalls 10, 12 and bottom 14, and a canal headgate structure 17.

As seen in FIG. 2, a fish safety conduit 18 is provided at one side of the canal. Within the canal is a stream 20 of water which flows swiftly in the direction of the arrows shown in FIG. 1 towards a water intake (not shown) for a hydroelectic plant.

Supported within the stream 20 is a fish guiding assembly embodying the present invention and comprised of a series of interengaged sections generally designated by the numeral 22. The assembly is secured in position by cables 24 which are secured to anchors 26 on the sidewalls 10, 12 and is oriented at angle to the sidewalls 10, 12 and stream 20 so that it is spaced closely to the sidewall 12 at its end adjacent the safety conduit 18. As can be seen in FIG. 2, the assembly is spaced above the bottom 14 of the canal.

Figure 3:
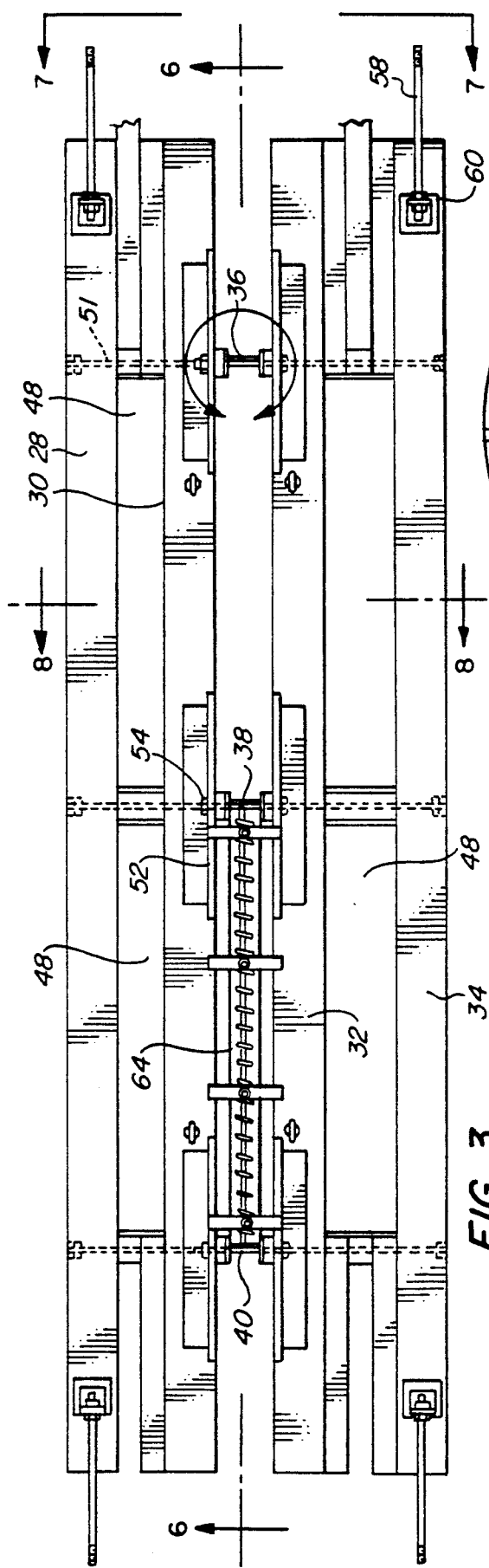
FIG. 3 is a fragmentary top plan view of a section of the assembly of FIG. 1.
Figure 4:
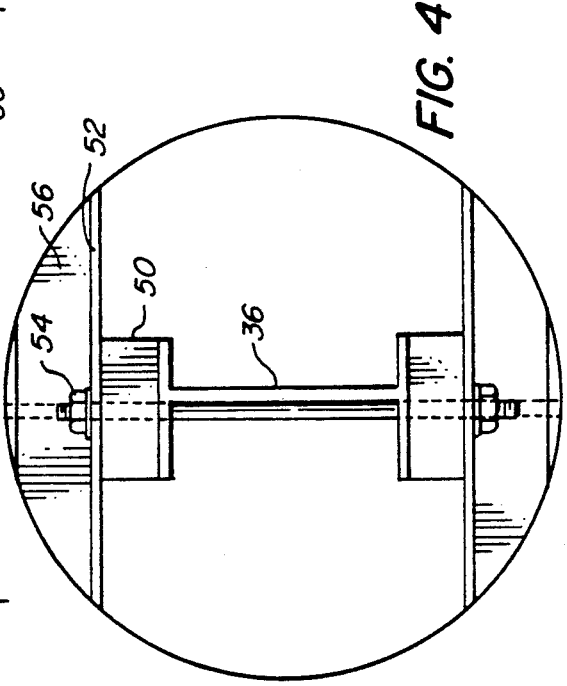
FIG. 4 is an enlarged plan view of-a fragmentary portion of the assembly of FIG. 3 shown by the double headed arc.
Figure 5:
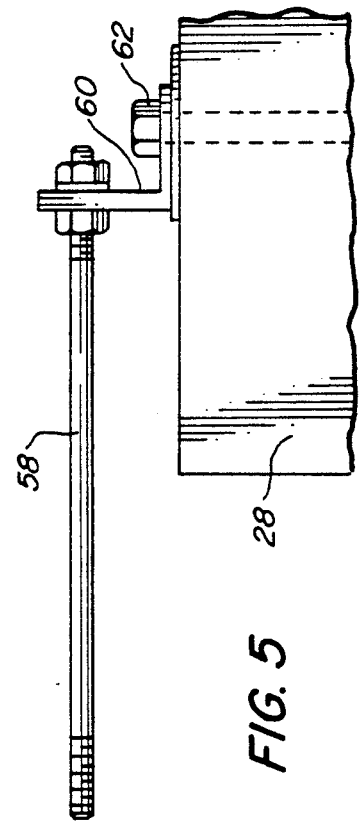
FIG. 5 is an enlarged side elevational view of one of the joints in FIG. 3.
Figure 6:
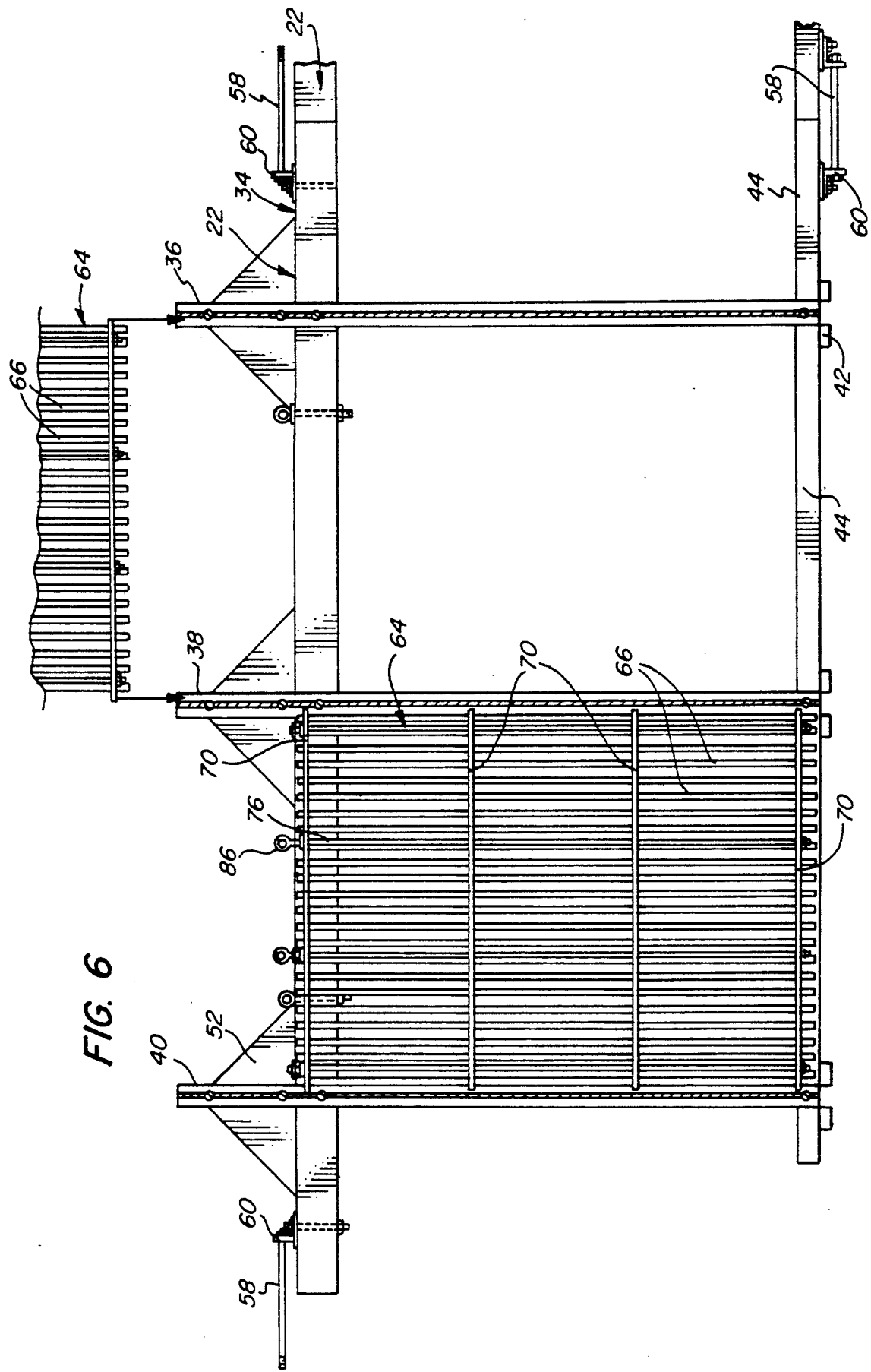
FIG. 6 is a fragmentary sectional view of the assembly along the line 6—6 of FIG. 3 with one of the lower slat assemblies shown prior to insertion into the frame.
Figure 7:
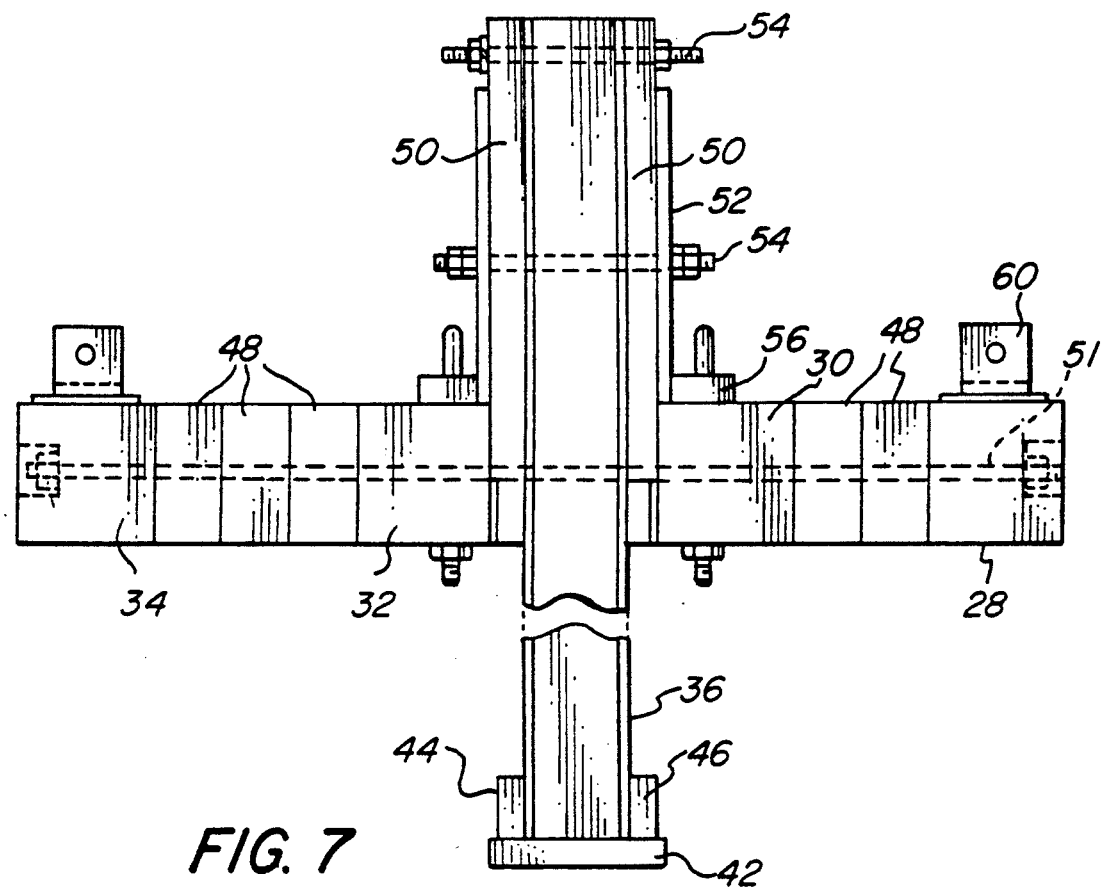
FIG. 7 is a fragmentary end elevational view of the assembly as seen along the line 7—7 of FIG. 3.
Figure 8:
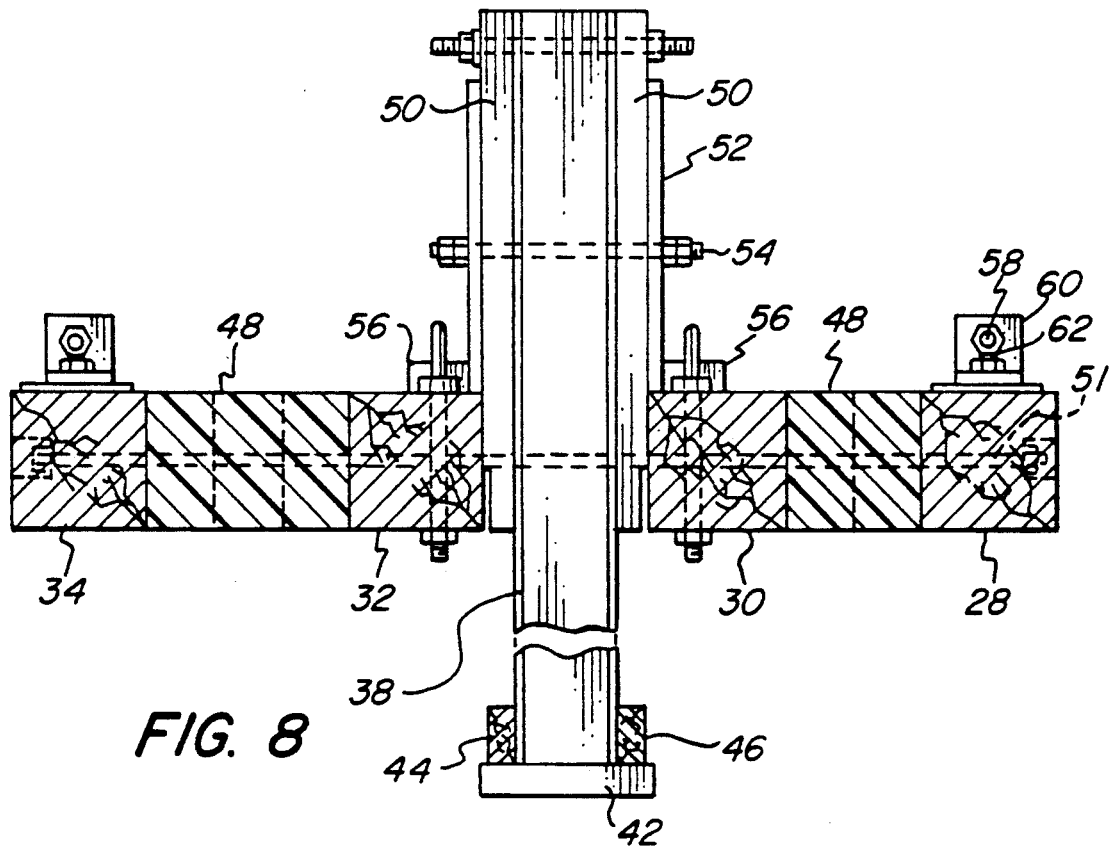
FIG. 8 is a fragmentary sectional view of the assembly along the line 8—8 of FIG. 3.

Turning now to FIGS. 3, 7 and 8, each of the sections 22 is comprised of a frame which includes at its upper end four longitudinally extending and horizontally spaced wooden frame members 28, 30, 32, 34, and the vertically extending I-beams 36, 38, 40 which extend above the frame members 28-34. At the lower end of the I-beams 36-40 are longitudinally extending wooden frame members 44, 46 and cross members 42. Disposed between the frame members 28, 30 and 32, 34 are longitudinally extending blocks 48 of cellular synthetic resin providing flotation for the frame.

On each end face of the upper end of the I-beams are wooden spacers 50 against which the frame members 30, 32 bear, and the several elements of the upper frame are secured in assembly by tie rods 51 extending transversely of the section 22. To minimize any tendency for twisting of the longitudinal frame members 28-34 relative to the I-beams 36-40, a pair of triangular braces 52 is provided at each I-beam, and they bear against the spacers 50; the spacers 50 and braces 52 are secured to the I-beams 36-40 by bolts 54. The lower edges of the braces 52 also bear against the upper surface of the frame members 30, 32 and the stops 56 secured thereto. Bolts 54 attach members 44 and 46 to the I-beams 36-40 at the bottom of the frame.

Adjacent sections 22 are secured together by tie bars 58 which extend between brackets 60 which are secured to adjacent ends of the outer frame members 28, 34 by bolts 62.

Figure 12:
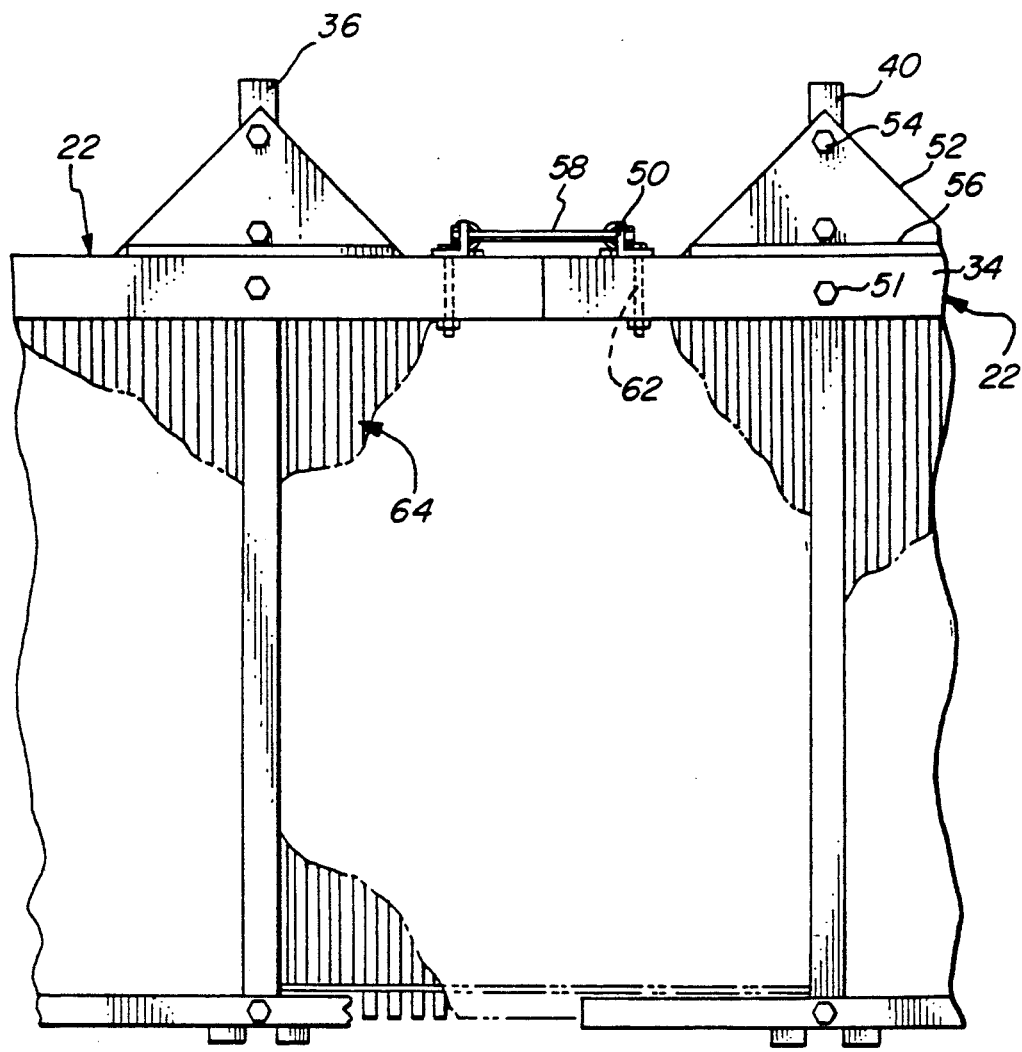
FIG. 12 is a fragmentary elevational view of the fish guiding assembly.
Figure 13:
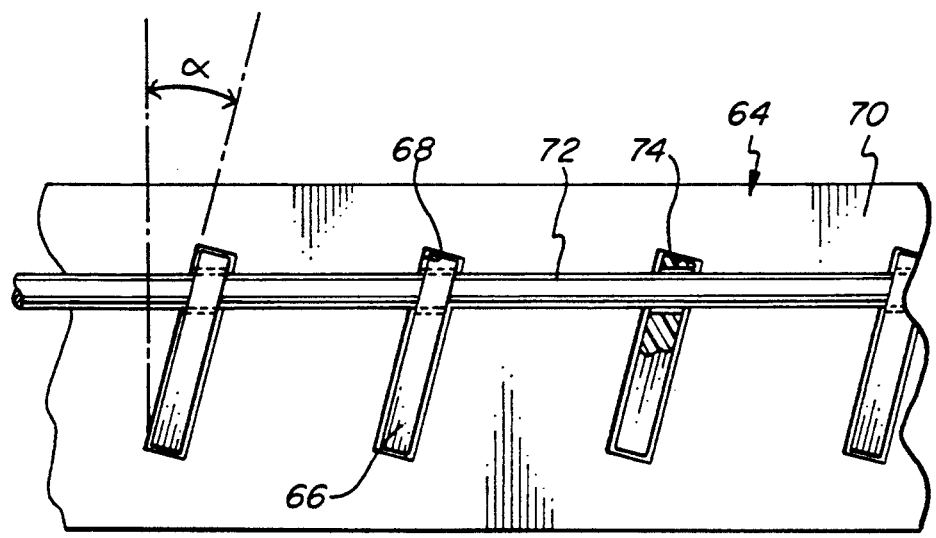
FIG. 13 is a fragmentary plan view in partial section of a lower slat assembly.

Disposed between the I-beams 36, 38, 40 and the frame members 30, 32 of the several sections 22 are lower slat assemblies generally designated by the numeral 64. A multiplicity of thin, synthetic resin slats 66 extends vertically through slots 68 in the horizontally extending synthetic resin support members 70. As seen in FIG. 12, the slots 68 are angularly oriented relative to the longitudinal axis of the support members 70 so that the faces of the slats 66 are oriented parallel to each other, but in angular orientation relative to the longitudinal axis of the sections 22.

To secure the slats 66 in the assembly, an elongated rod 72 extends horizontally through apertures 74 adjacent the upper ends of the slats 66 and above the upper support member 70. Vertical tie rods 76 extend through aligned apertures in the several support members 70, and are secured in assembly by a series of washers 78, nuts 80, spacer 82, and a horizontal support plate 84 assembled on the upper end portion of the rods 76. A lifting ring 86 provides the uppermost element of the upper assembly; at the lower end of each of the rods 76 is a pair of nuts 80 and a washer 78.

In the preferred structure, the cables 24 extend along the full length of the fish guiding assembly, and thus, also serve to secure the sections together.

A highly satisfactory assembly has been fabricated utilizing wooden members of 8 inch×8 inch cross section and 18 feet in length for the upper wooden frame members. The I-beams are 10 feet in length with 6 inch flanges and a 6 inch web. The spacers are conveniently 2 inch×4 inch wooden members of approximately 2½ feet in length. The stops are also 2 inch×4 inch of approximately 2½ feet in length. The flotation members are conveniently extruded polystyrene foam having a depth of 8 inches, and can conveniently be laid up from insulating slabs of 2 inch thickness, conveniently of the type used for insulation.

The lower frame members extending along the base of the sections are conveniently 2 inch×4 inch members.

The three I-beams are conveniently spaced 6 feet on centers, thus providing projecting end portions on the longitudinally extending frame members of approximately 3 feet.

To provide high strength in the assembly, threaded rod of ¾ inch diameter is conveniently used to provide the tie rods. The diagonal braces are conveniently plywood of ¾" thickness.

Turning now to the lower slat assemblies, the support members and slats are conveniently fabricated from polypropylene although other resins may also be employed. The support members are ½ inch in thickness, approximately 5 inches in width and approximately 6 feet long, so that they will define a slat assembly fitting between the I-beams. The slats are fabricated from ⅜ inch thick material, have a width of 2½ inches and are 8 feet in length. The slots in which are seated the slats provide some clearance about the slats, and the rod which secures the upper ends of the slats in position is ½ inch in diameter as are the vertical tie rods for the lower slat assembly. The support plates which seat on the frame members are conveniently fabricated from steel of 3/16 inch thickness with a width of 2 inches and a length of 1 foot.

The slots are desirably arranged at a spacing of 2–6 inches depending upon the type and size of fish which are to be guided by the assembly. Thus, the support members can be fabricated with a large number of slots at 2 inch spacing and alternate slots can be utilized to produce a 4 inch spacing; or spacings of 3 and 6 inches can be utilized by providing slots every 3 inches.

The fish guiding assembly is oriented at an angle (b) to the stream flow, preferably about 15° although the angle can vary depending upon the velocity of the stream and the length of the fish guiding assembly. The slots in the slat support members should be oriented at an angle (a) of 10°–20° to the longitudinal axis of the frame and preferably approximately 15° so that the slats are disposed at an angle of about 90° to the direction of flow of the stream to produce maximum turbulence in the water flowing thereabout.

The fish guiding assembly need not extend close to the bottom of the stream in the event that the stream is fairly deep; a depth of 6–12 feet will normally be sufficient to effect desirable guidance of the fish since they generally travel close to the surface. The turbulence about the slats causes the fish to move away from the fish guiding assembly, and it may be used to direct them towards a safety conduit or fish bypass, allowing the fish to pass about a dam or other obstruction.

The flexibility of the polypropylene slats allows them to withstand impacts from branches and other debris flowing in the stream, and the spacing allows some of the debris to move therethrough. Moreover, the slats can resiliently deform upon impact to permit such passage. In periods of extreme debris flow in the stream such as an early spring flooding, the slat assemblies can be removed to minimize the potential for damage to the fish guidance assembly.

It appears that the turbulence to achieve desirable guidance of the fish requires a stream flow rate of from 1 to 5 feet per second. This rate of stream flow will produce significant turbulence (and sound waves) in the water to effect diversion of the fish from the surface of the fish guiding assembly.

As will be readily appreciated, a large number of sections may be assembled in order to provide a suitable angularly oriented guidance wall in a relatively wide stream. Connection of the several sections is readily effected by passing the tie rods through the brackets in the adjacent sections as they are aligned in the stream and fastening them in place by nuts and the like. Although the lower tie rods are below the water line, a diver can easily effect the assembly of the lower ends which are spaced above the bottom of the stream bed.

In periods of high debris flow, the spacing of the slats can be increased to allow more debris to flow through the slat assemblies, or the slat assemblies can be physically removed for a period of time. Removal and replacement of the lower slat assembly is relatively easy by use of the lifting rings to remove the assembly for storage or to enable removal of some of the slots. After the heavy debris flow has terminated, the slat assemblies can be reinserted into their position within the frame sections.

As will be readily appreciated, the components of the fish guiding assembly are relatively low cost and generally long lived so that the assemblies are relatively economical to fabricate and to maintain. Because the unit floats within the body of the water, it can be readily assembled in place, and its placement and angular orientation can be varied in order to produce the desired level of turbulence thereabout. The spacing between the slats can be modified as desired by removing slats, or by utilizing support members providing different slat spacing.

Having thus described the invention, what is claimed is:

1. A fish guiding assembly for use adjacent to dams and the like to channel fish into a safe passage comprising:
   (a) an elongated buoyant frame including upper and lower elongated horizontally extending frame members;
   (b) a multiplicity of vertically extending louver slats of synthetic resin horizontally spaced apart and angularly oriented relative to the longitudinal axis of said frame;
   (c) upper and lower slat mounting members extending horizontally along the length of the frame and supported thereby, said slat mounting members engaging the slats adjacent their upper and lower ends to retain them in angular orientation; and
   (d) engaging means securing the upper ends of said louver slats to maintain them in said mounting members.

2. The fish guiding assembly in accordance with claim 1 wherein said slat mounting members are elongated and horizontally disposed and have slots therein through which said louver slats extend.

3. The fish guiding assembly in accordance with claim 2 wherein said slat mounting members are fabricated from synthetic resin.

4. The fish guiding assembly in accordance with claim 2 wherein said engaging means comprises an elongated rod extending through the upper ends of said slats above said upper slat mounting member.

5. The fish guiding assembly in accordance with claim 1 wherein said frame also includes members vertically extending between said horizontally extending frame members.

6. The fish guiding assembly in accordance with claim 5 wherein said frame includes buoyant elements in addition to said horizontally and vertically extending members.

7. The fish guiding assembly in accordance with claim 1 wherein said frame is fabricated from a multiplicity of disassemblable sections to provide an elongate structure and includes coupling elements to join said sections in rigid assembly.

8. The fish guide assembly in accordance with claim 7 wherein said longitudinally extending frame members are fabricated of wood and said frame includes a pair of vertically extending members spaced intermediate the length thereof and extending between said longitudinally extending frame members, said coupling elements coupling the abutting ends of said horizontally extending frame members of adjacent sections.

9. The fish guide assembly in accordance with claim 8 wherein said sections include two spaced pairs of wood members along the top of said frame members, one pair extending longitudinally along each side of said vertical members.

10. The fish guide assembly in accordance with claim 9 wherein buoyant elements are disposed in the spacing between the wood members of each pair.

11. The fish guide assembly in accordance with claim 8 wherein said slats, slat mounting members and engaging means are preassembled to provide a slat assembly and wherein said seat assembly is removably seated in the spacing between longitudinally extending wooden members and the vertical members of said frame.

12. The fish guiding assembly in accordance with claim 1 wherein said frame includes securing means for engagement with cables and the like to secure said assembly in position within a flowing body of water.

13. A fish guiding assembly for use adjacent to dams and the like to channel fish into a safe passage comprising:
   (a) an elongated buoyant frame including upper and lower elongated horizontally extending frame members, vertically extending frame members between said horizontally extending members, and buoyant elements in addition to said horizontally and vertically extending members, said frame being fabricated from a multiplicity of dissemblable sections to provide an elongate structure and including coupling elements to join said sections in rigid assembly;
   (b) a multiplicity of vertically extending louver slats of relatively flexible synthetic resin horizontally spaced apart and angularly oriented relative to the longitudinal axis of said frame;
   (c) upper and lower slat mounting members extending horizontally along the length of the frame and supported thereby, said slat mounting members engaging the slats adjacent their upper and lower ends to retain them in angular orientation, said louver slat mounting members being horizontally disposed and having slots therein through which said louver slats extend; and (d) engaging means securing the upper ends of said louver slats to maintain them in said mounting members.

14. The fish guiding assembly in accordance with claim 13 wherein said slat mounting members are fabricated from synthetic resin, and said engaging means comprises an elongated rod extending through the upper ends of said slats above said upper slat mounting member.

15. The fish guiding assembly in accordance with claim 13 wherein said frame includes buoyant elements in addition to said horizontally and vertically extending members.

16. The fish guide assembly in accordance with claim 13 wherein said longitudinally extending frame members are fabricated from wood and said frame includes a pair of vertically extending members spaced intermediate the length thereof and extending between said horizontally extending frame members, said coupling elements coupling the abutting ends of said longitudinally extending frame members of adjacent sections, said sections including two spaced pairs of wood frame members, one pair extending longitudinally along each side of vertical members at the top of said frame, and wherein buoyant elements are disposed in the spacing between the wood members of each pair.

17. The fish guide assembly in accordance with claim 13 wherein said slats, slat mounting members and engaging means are preassembled to provide a slat assembly and said slat assembly is removably seated in the spacing between the horizontally extending wooden members and the vertical members, and wherein said frame includes securing means for engagement with cables and the like to secure said assembly in position within a flowing body of water.

18. In a method for guiding fish into a safe passage, the steps comprising:

(a) providing a fish guiding assembly comprising (i) an elongated buoyant frame including upper and lower elongated horizontally extending frame members, (ii) a multiplicity of vertically extending louver slats of synthetic resin horizontally spaced apart and angularly oriented relative to the longitudinal axis of said frame; (iii) upper and lower slat mounting members extending horizontally along the length of the frame and supported thereby, said slat mounting members engaging the slats adjacent their upper and lower ends to retain them in angular orientation and (iv) engaging means securing the upper ends of said louver slats to maintain them in said mounting members; and (b) suspending said fish guiding assembly substantially perpendicularly in a flowing stream of water adjacent a safe passage, said fish guiding assembly being oriented at an angle to said safe passage to direct fish thereto, said assembly being oriented in said stream to orient said slats at about 90° to the flow of said stream to create turbulence in the stream flow about them and thereby cause fish to stay away from the fish guiding assembly.

19. The fish guiding method in accordance with claim 18 wherein there is included the step of securing said fish guiding assembly in position by cables.

20. The fish guiding method in accordance with claim 18 wherein said frame is assembled by coupling a multiplicity of disassemblable sections to provide an elongate structure.

* * * * *